(12) United States Patent
Lee et al.

(10) Patent No.: US 8,823,974 B2
(45) Date of Patent: Sep. 2, 2014

(54) METHOD AND APPARATUS FOR PROCESSING SCAN DATA

(75) Inventors: Dong-woo Lee, Suwon-si (KR); Ji-won Jeong, Suwon-si (KR); Yong-suk Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 12/496,991

(22) Filed: Jul. 2, 2009

(65) Prior Publication Data

US 2010/0097638 A1  Apr. 22, 2010

(30) Foreign Application Priority Data

Oct. 17, 2008  (KR) .................. 10-2008-0102150

(51) Int. Cl.
  *G06F 3/12*  (2006.01)
  *G06K 15/00*  (2006.01)
  *H04N 1/04*  (2006.01)
(52) U.S. Cl.
  USPC ........ 358/1.15; 358/1.13; 358/1.16; 358/474; 358/476
(58) Field of Classification Search
  None
  See application file for complete search history.

(56) References Cited

U.S. PATENT DOCUMENTS

2001/0022624 A1 * 9/2001 Tanaka et al. ............ 348/333.02
2006/0146373 A1 * 7/2006 Corrion .................... 358/474
2008/0270516 A1 * 10/2008 Ragnet et al. ............ 709/202

FOREIGN PATENT DOCUMENTS

| JP | 2001-238118 A | 8/2001 |
| JP | 2004-265409 A | 9/2004 |
| JP | 2006-287860 A | 10/2006 |

OTHER PUBLICATIONS

Communication dated Jul. 10, 2014 from the Korean Intellectual Property Office in a counterpart Korean application No. 10-2008-0102150.

* cited by examiner

Primary Examiner — Thomas Lett
(74) Attorney, Agent, or Firm — Sughrue Mion, PLLC

(57) ABSTRACT

Provided are a scan data processing method and apparatus. The method includes: performing a wireless communication connection with a predetermined user device during a scan mode; detecting user profile information corresponding to a user address of the predetermined user device; and controlling scan data based on the user profile information.

19 Claims, 5 Drawing Sheets

METHOD AND APPARATUS FOR PROCESSING SCAN DATA

CROSS-REFERENCE TO RELATED PATENT APPLICATION

This application claims the benefit of Korean Patent Application No. 10-2008-0102150, filed on Oct. 17, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to image processing, and more particularly, to a method and apparatus for controlling scan data by using a user profile of a user device in an image processing apparatus having a scan function.

2. Description of the Related Art

In general, multi-functional products (MFPs) have copy and scan functions.

An MFP obtains document data from an image to be scanned or a page of a document, and prints the document data or transmits the document data to a client personal computer (PC) by using a communication apparatus such as a modem.

The MFP is connected to a plurality of client PCs over a network and has a network scan function for transmitting document data to each client PC.

The MFP needs additional information so as to store scan data and perform user authentication during a scan operation. Thus, the MFP must input the additional information so as to store the scan data when performing the network scan function.

SUMMARY OF THE INVENTION

Exemplary embodiments of the present invention provide a method and apparatus for controlling scan data by using a user profile of a user device in an image processing apparatus, such as a network scanner or a multi-functional product (MFP).

According to an aspect of the present invention, there is provided a scan data processing method performed by an image processing apparatus, the method comprising: performing a wireless communication connection with a predetermined user device during a scan mode; detecting user profile information corresponding to a user address of the predetermined user device; and controlling scan data based on the user profile information.

The performing of the wireless communication connection may comprise: inquiring whether there is a connectable device by using a predetermined wireless communication protocol if the scan mode is executed; and if it is determined that there is a connectable device, detecting a user address of a device connected over a wireless communication network.

The predetermined user device may be a wireless terminal or an electronic card having the predetermined wireless communication protocol.

The controlling of the scan data may comprise: searching a plurality of client recipients registered in the user profile and transmitting the scan data to a corresponding client recipient.

The controlling of the scan data may further comprise: displaying a list of a plurality of client recipients registered in the user profile information on a screen; selecting at least one of the displayed plurality of client recipients; and transmitting the scan data to the selected at least one client recipient.

According to another aspect of the present invention, there is provided a scan data processing method comprising: establishing a predetermined wireless communication network connection to a user device and simultaneously executing a scan mode; detecting a user ID of the user; loading a client folder from user profile information allocated to the user ID; and transmitting scan data to the client folder.

According to another aspect of the present invention, there is provided a scan data processing apparatus comprising: a wireless network connecting unit performing a wireless communication connection with a user device including a predetermined wireless communication protocol; a storage unit storing a user address and user profile information of the user device; and a controller establishing a connection with the user device including the predetermined wireless communication protocol by using the wireless network connecting unit during execution of a scan mode, detecting user profile information corresponding to a previously stored user address of the user device, and controlling scan data based on the user profile information.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail by explaining the exemplary embodiments of the invention with reference to the attached drawings.

Figure 1:
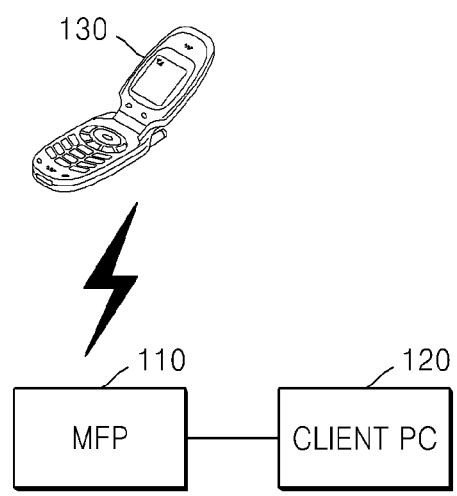
FIG. 1 is a diagram of a system for processing scan data according to an exemplary embodiment of the present invention.

FIG. 1 is a diagram of a system for processing scan data according to an exemplary embodiment of the present invention. Referring to FIG. 1, the system for processing scan data comprises a multi-functional product (MFP) 110, a client personal computer (PC) 120, and a user device 130. The MFP 110 may be replaced with a network scanner. The user device 130 may be a wireless terminal such as a cellular phone having a wireless communication protocol, and an electronic card such as a wireless frequency (RF) card, a credit card, a transportation card, etc. having the wireless communication protocol. The electronic card includes a user address and user profile information.

The MFP 110 and the client PC 120 are connected to each other via a local area network (LAN) cable or via wireless connection.

Alternatively, the MFP 110 and the client PC 120 may be connected to each other via a serial interface specification such as a universal serial bus (USB).

The MFP 110 has copy, scan, and wireless communication protocol functions, performs a wireless communication protocol connection with the user device 130 during a scan mode, detects the user profile information corresponding to the user address of the user device 130, and transmits scan data to the client PC 120 based on the user profile information. The wireless communication protocol uses Bluetooth communication in an exemplary embodiment. In an exemplary embodiment, Bluetooth may be one of Bluetooth 1.x, 2.x, or 3.x specifications. Other wireless local area network (WLAN) standards such as 802.11a, 802.11b, 802.11g, 802.11n, etc., may be utilized as the wireless communication protocol in other exemplary embodiments. The MFP 110 stores the user address of the user device 130 and the user profile information registered by the client PC 120 via a network.

If a plurality of client PCs are connected to the MFP 110, the MFP 110 displays a plurality of client recipients on a screen, and transmits the scan data to client recipients selected by a user from among the client recipients on the screen.

The user device 130 is a mobile device or a cellular phone and uses a personal area network (PAN) such as a Bluetooth network, or a WLAN network, in exemplary embodiments. The user device 130 includes the user address and the user profile information.

The client PC 120 searches for and registers an IP of the MFP 110 over the network, and registers the user address of the user device 130 and the user profile information when installing a scanner driver.

Figure 2:
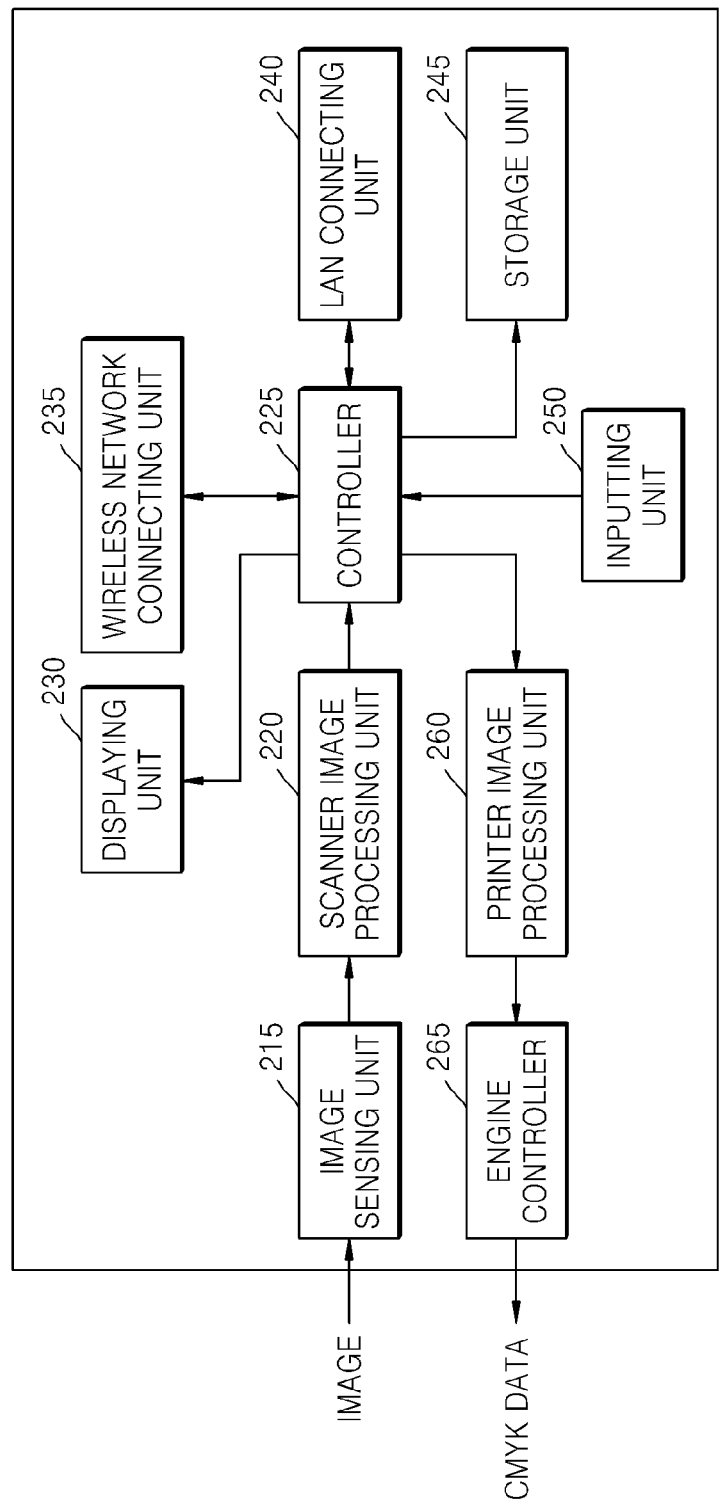
FIG. 2 is a block diagram of a multi-functional product (MFP) according to an exemplary embodiment of the present invention.

FIG. 2 is a block diagram of an MFP according to an embodiment of the present invention. Referring to FIG. 2, the MFP comprises an image sensing unit 215, a scanner image processing unit 220, a controller 225, a displaying unit 230, a wireless network connecting unit 235, a LAN connecting unit 240, a storage unit 245, an inputting unit 250, an engine controller 265, and a printer image processing unit 260.

The image sensing unit 215 recognizes image data or document data that is to be scanned.

The scanner image processing unit 220 performs a predetermined image processing operation such as edge focusing or image correction with regard to the image data recognized by the image sensing unit 215.

The printer image processing unit 260 converts the image data processed by the scanner image processing unit 220 into cyan magenta yellow black (CMYK) data to be printed.

The engine controller 265 transmits the CMYK data output by the printer image processing unit 260 to a printer.

The inputting unit 250 inputs an instruction by a user manipulating a plurality of key modules or a touch screen.

The storage unit 245 includes a flash memory or a hard disk drive and stores a control program used to drive the controller 225 and the scan data.

In particular, the storage unit 245 stores a user address of a registered personal terminal and user profile information.

The displaying unit 230 displays various pieces of display data and a text message, generated by the controller 225, on a liquid crystal display (LCD) panel. In particular, the displaying unit 230 displays the user profile information and a client recipient list detected by the controller 225.

If the wireless network connecting unit 235 is connected to peripheral devices via a wireless communication chip, e.g., a PAN/WLAN communication chip, the wireless network connecting unit 235 communicates data necessary for a communication setup with the peripheral devices so as to perform local wireless/wired communication such as Bluetooth communication, infrared (IR) communication, wireless local area network communication, or wired communication.

The LAN connecting unit 240 transmits the scan data to a plurality of client PCs via a LAN cable.

The controller 225 sends the image data processed by the scanner image processing unit 220 to the printer image processing unit 260, if the controller 225 receives a scan mode execution instruction from the inputting unit 250, performs a connection setting with the user device 130 including a predetermined wireless communication protocol via the wireless network connecting unit 235, detects the user profile information corresponding to the user address of the user device 130 from the storage unit 245, and controls the scan data based on the user profile information.

Figure 3:
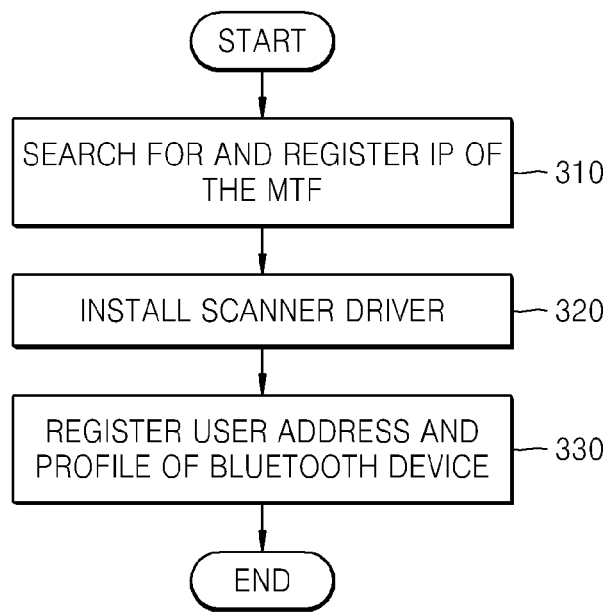
FIG. 3 is a flowchart illustrating a scan control establishing process performed by a client personal computer (PC) shown in FIG. 1 according to an exemplary embodiment of the present invention.

FIG. 3 is a flowchart illustrating a scan control establishing process performed by the client PC 120 shown in FIG. 1 according to an exemplary embodiment of the present invention. Referring to FIG. 3, the client PC 120 searches for and registers a IP of the MFP 110 connected to the client PC 120 via a network or registers the IP of the MFP 110 by inputting a key (operation 310).

The client PC 120 installs a scanner driver (operation 320).

The client PC 120 registers a user address of the user device 130 having a wireless communication protocol such as Bluetooth or WLAN, and user profile information (operation 330). The user profile information includes user information, a client folder, or a scan data format.

Figure 4:
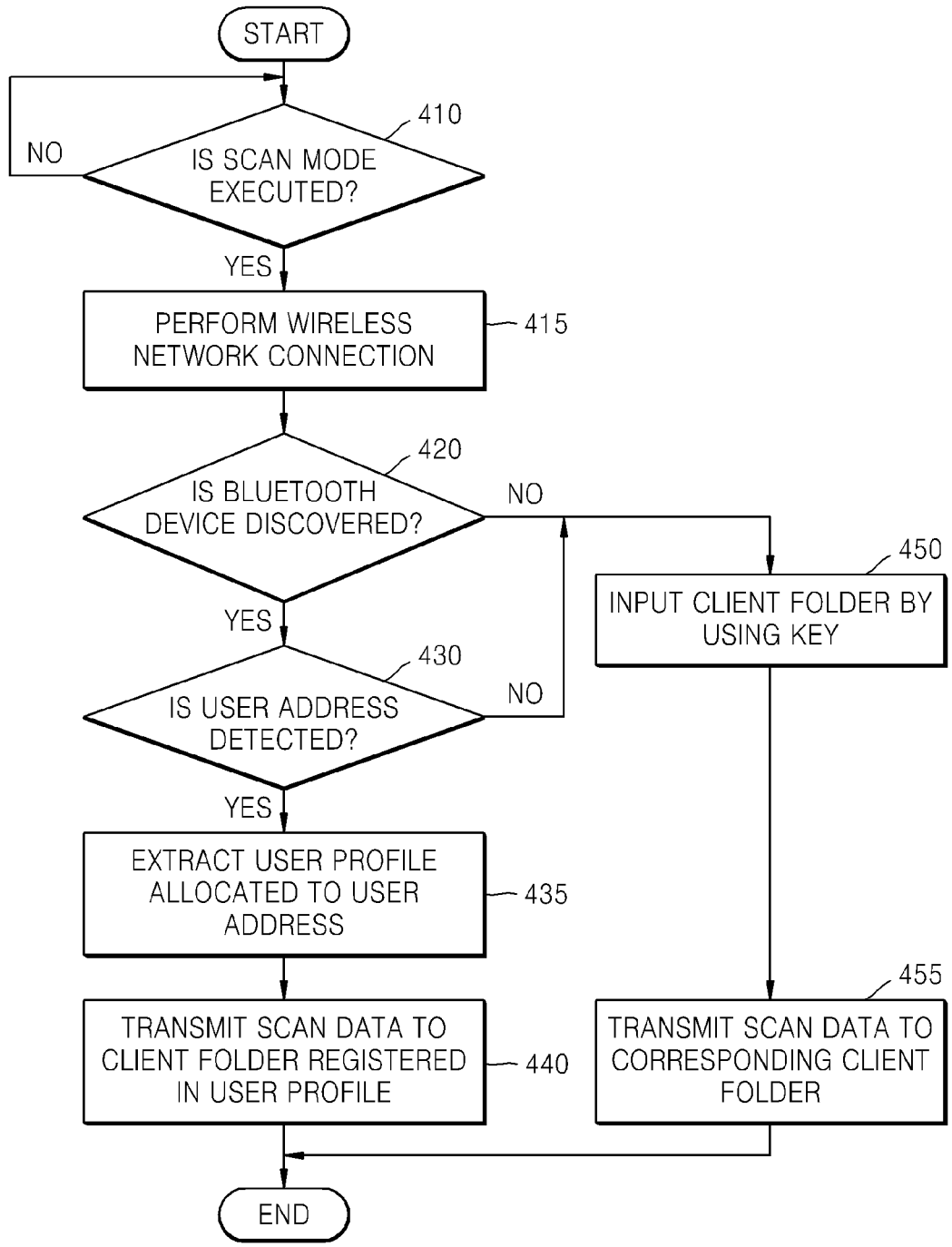
FIG. 4 is a flowchart illustrating a scan data processing method performed by an MFP shown in FIG. 1 according to an exemplary embodiment of the present invention.

FIG. 4 is a flowchart illustrating a scan data processing method performed by the MFP 110 shown in FIG. 1 according to an embodiment of the present invention. Referring to FIG. 4, the MFP 110 receives the user profile information and the user address of the user device 130 having the wireless communication protocol from the client PC 120, and registers the user address of the user device 130 and the user profile information in a specific area of memory.

A user who desires to perform a scan function physically places the user device 130 of a local wireless communication protocol onto a predetermined location of the MFP 110.

The MFP 110 determines whether to execute a scan mode (operation 410). For example, the MFP 110 determines whether to execute the scan mode by checking whether the user pushes a scan execution key.

If the scan mode is executed, a local wireless communication use mode is automatically established, so that the MFP 110 performs a local wireless network connection with the user device 130 (operation 415). Local wireless communication may use Bluetooth communication, IR communication, WLAN or other wireless communication. The Bluetooth communication may be used to connect a device 10 m in general, or 100 m at the maximum, away, irrespective of an obstacle therebetween. The Bluetooth communication automatically may recognize a Bluetooth device at a short range, maintain connection with the Bluetooth device, and identify devices by using an intrinsic number established for a Bluetooth module or a chip and a user intrinsic number input by the user. The IR communication basically operates within 1 m and has a directivity structure capable of communicating data in a specific direction.

The MFP 110 simultaneously performs the local wireless network connection with a wireless communication protocol terminal and the execution of the scan mode.

Alternatively, the user may manually establish the local wireless communication use mode. Thus, if the scan mode is executed, the MFP 110 may determine whether the local wireless communication use mode is established, and perform the wireless network connection with the user device 130.

The MFP 110 determines if there is a connectable device via the local wireless communication protocol (operation 420). For example, the MFP 110 performs a scan operation to inquire whether to access another device within a wireless coverage area of the MFP 110 by using a service discovery profile. The MFP 110 determines whether another Bluetooth device is discovered within a local Bluetooth communication area by performing the scan operation.

If there is no connectable device through the local wireless communication protocol or a user device of a personal terminal or an electronic card is not detected, the MFP 110 receives a client recipient (folder) input by a key (operation 450), and transmits the scan data to a client recipient (folder) (operation 455).

If the connectable device is discovered, the MFP 110 detects the user address of the user device 130 via the wireless communication network (operation 430).

The MFP 110 determines whether the user address of the personal terminal or the electronic card has been registered.

Thereafter, if the user address has been registered, the MFP 110 extracts user profile information allocated to the user address of the user device 130 (operation 435).

The user profile information includes device user information, a client folder used to receive the scan data, etc.

The MFP 110 searches for a client recipient that is previously registered in the user profile information. Alternatively, the client recipient registered in the user profile information may be displayed on a screen.

The MFP 110 transmits the scan data to the client recipient (e.g., the client folder) registered in the user profile (operation 440).

The user acknowledges a scan file in a folder registered in a user's local PC.

The MFP 110 of the present embodiment detects the user ID of the user device 130, and automatically loads the client recipient registered in the user profile information, and does not need to input additional information (e.g., registered ID and password) so as to store the scan data.

Figure 5:
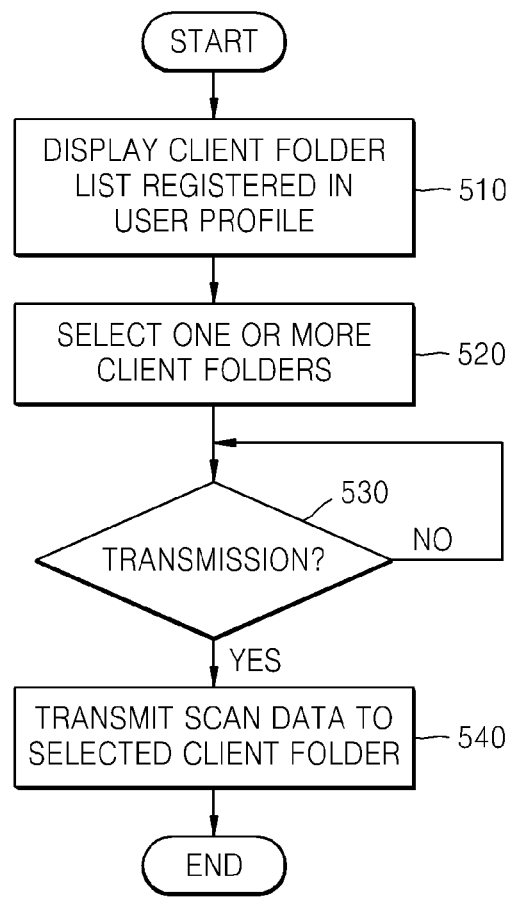
FIG. 5 is a flowchart illustrating an operation of transmitting scan data, as shown in FIG. 4, when a plurality of client PCs are connected to the MFP according to an exemplary embodiment of the present invention.

FIG. 5 is a flowchart illustrating operation 440 of transmitting the scan data, as shown in FIG. 4, when a plurality of client PCs are connected to the MFP 110 according to an embodiment of the present invention. Referring to FIG. 5, the MFP 110 displays a list of client recipients (or folders) registered in a user profile on an LCD panel (operation 510).

The MFP 110 selects one or more client recipients from the list of client recipients (operation 520).

The MFP 110 determines whether a transmission button is pushed (operation 530).

If it is detected that the transmission button was pushed, the MFP 110 transmits the scan data to the selected client recipients (operation 540).

A user acknowledges a scan file from a scan data folder registered in a user's local PC.

The MFP 110 notifies the client recipients of the transmission of the scan file via email.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In other exemplary embodiments, computer readable medium may include carrier waves. The computer readable recording medium can also be distributed network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scan data processing method performed by an image processing apparatus, the method comprising:
   determining whether there is a connectable device by using a wireless communication protocol when a scan mode is executed;
   automatically performing wireless communication with a user device in response to the determining;
   obtaining user profile information corresponding to a user address of the user device in response to detecting the user address of the user device, and loading a client folder registered in the user profile information; and
   controlling scan data based on the obtained user profile information,
   wherein the controlling of the scan data comprises transmitting the scan data to the client folder registered in the user profile information.

2. The method of claim 1, wherein the performing of the wireless communication comprises:
   inquiring whether there is a connectable device by using a wireless communication protocol when the scan mode is executed; and
   if there is the connectable device, detecting the user address of the connectable device connected over a wireless communication network, the connectable device being the user device.

3. The method of claim 1, wherein the user device is a wireless terminal or an electronic card operating in a wireless communication protocol.

4. The method of claim 1, wherein a connection to the user device is established simultaneously with an execution of the scan mode.

5. The method of claim 2, wherein the wireless communication protocol is a personal area network (PAN) specification.

6. The method of claim 2, wherein the wireless communication protocol is Bluetooth communication or infrared communication.

7. The method of claim 1, wherein the controlling of the scan data comprises searching a plurality of client recipients registered in the user profile and transmitting the scan data to a corresponding one of the plurality of client recipients.

8. The method of claim 1, further comprising displaying a client recipient registered in the user profile information, on a screen.

9. The method of claim 1, wherein the controlling of the scan data further comprises:
   displaying a list of a plurality of client recipients registered in the user profile information, on a screen;
   selecting at least one of the displayed plurality of client recipients; and
   transmitting the scan data to the selected at least one of the displayed plurality of client recipients.

10. The method of claim 9, wherein a scan file is transmitted to the selected at least one of the displayed plurality of client recipients via email.

11. The method of claim 1, wherein, if a Bluetooth device is not found, a key is used to input a client recipient, and the scan data is transmitted to the client recipient.

12. The method of claim 1, further comprising registering the user address and the user profile information of the user device.

13. A scan data processing method comprising:
   determining whether there is a connectable device by using a wireless communication protocol when a scan mode is executed;
   substantially simultaneously automatically establishing a wireless communication network connection to a user device in response to the determining and executing the scan mode;
   detecting a user ID of the user;
   loading a client folder from user profile information allocated to the user ID, the user profile information including information relating to a client folder for receiving scan data; and
   transmitting the scan data to the client folder.

14. A scan data processing apparatus comprising:
   a wireless network connecting unit which determines whether there is a connectable device by using a wireless communication protocol when a scan mode is executed and, based on the determination, automatically performs wireless communication with a user device of the wireless communication protocol;
   a storage unit which stores a user address and user profile information of the user device; and
   a controller which establishes a connection with the user device of the wireless communication protocol by using the wireless network connecting unit during execution of a scan mode, detects user profile information corresponding to a previously stored user address of the user device, loads a client folder registered in the user profile information, and controls scan data based on the user profile information by transmitting the scan data to the client folder registered in the user profile information.

15. The method of claim 14, further comprising a displaying unit which displays a list of client recipients registered in the user profile information.

16. A non-transitory recording medium storing a computer program for executing a scan data processing method performed by an image processing apparatus, the method comprising:
   determining whether there is a connectable device by using a wireless communication protocol when a scan mode is executed;
   automatically performing a wireless communication connection with a user device in response to the determining;
   obtaining user profile information corresponding to a user address of the user device in response to detecting the user address of the user device, and loading a client folder registered in the user profile information; and
   controlling scan data based on the obtained user profile information,
   wherein the controlling of the scan data comprises transmitting the scan data to the client folder registered in the user profile.

17. An image scan data processing method of an image processing apparatus, the method comprising:
   determining whether there is a connectable device by using a wireless communication protocol when a scan mode is executed;
   automatically establishing by the image processing apparatus, in response to the determining, wireless communication with a mobile device when a user selects a scan command on the mobile device;
   determining an address of the mobile device after establishing the wireless communication;
   determining information corresponding to the determined address of the mobile device, the information being stored in a storage of the image processing device, and loading a client folder registered in the determined information; and
   transmitting a scanned data image generated by the image processing apparatus in response to the selected scan command, to the client folder registered in the determined information.

18. The method of claim 17, wherein the information is stored in the storage prior to the user selecting the scan command.

19. The method of claim 17, wherein the wireless communication is one of a Bluetooth specification and a wireless local area network standard.

* * * * *